Nov. 22, 1966  G. VERIK  3,286,623
SPECIAL CYLINDRICAL IMPRINTING MACHINE
Filed Sept. 9, 1965  8 Sheets-Sheet 6

INVENTOR
GEZA VERIK
BY Polachek & Saulsbury
ATTORNEYS

Nov. 22, 1966 G. VERIK 3,286,623
SPECIAL CYLINDRICAL IMPRINTING MACHINE
Filed Sept. 9, 1965 8 Sheets-Sheet 8

INVENTOR
Geza Verik
BY Polachek & Saulsbury
ATTORNEYS

United States Patent Office 3,286,623
Patented Nov. 22, 1966

3,286,623
SPECIAL CYLINDRICAL IMPRINTING MACHINE
Geza Verik, 50 Green St., College Point, N.Y.
Filed Sept. 9, 1965, Ser. No. 486,155
9 Claims. (Cl. 101—37)

This invention relates generally to printing machinery. More specifically, it relates to machinery for imprinting upon cylindrical objects.

A principal object of the present invention is to provide a printing machine for printing various texts such as advertisements, mottos and names together with emblems and other designs upon the outer cylindrical surfaces of writing pens and were in printed matter, they would be in two colors.

Another object of the present invention is to provide a pen imprinting machine having the above object and wherein the machine will automatically imprint a large quantity of pens in a rapidly successive manner.

Another object of the present invention is to provide a pen imprinting machine having the above object and wherein the machine handles each pen successively during which time one color is imprinted successively after the other color thereupon.

Still another object of the present invention is to provide a pen imprinting machine having a novel printing head which is fully self-adjustable and wherein the printing head carries both color printing plates.

Still another object of the present invention is to provide a pen imprinting machine wherein a singular rotatable printing head carries two color printing plates and wherein each color printing plate is automatically inked with its own respective color during continuous rotation of the printing head.

A yet further object of the present invention is to provide a pen imprinting machine wherein the printing head provides means for rotating a pen during the printing operation.

Yet a further object of the present invention is to provide a pen imprinting machine wherein the printing head has means for adjustment of the printing color plates relative to each other so that the colors in the printed design will be in proper register relative to one another.

A still further object of the present invention is to provide a pen imprinting machine having a novel feed mechanism whereby each successive pen is imprinted in the same place respective to the clip secured upon the barrel thereof and wherein means is provided for clearing of the clip during the printing operation.

Other objects are to provide a pen imprinting machine which is relatively simple in design, rugged in construction, fully adjustable, easy to operate and efficient in production.

These and other objects will be readily evident upon a study of the following specification and the accompanying drawings wherein.

Figure 1:
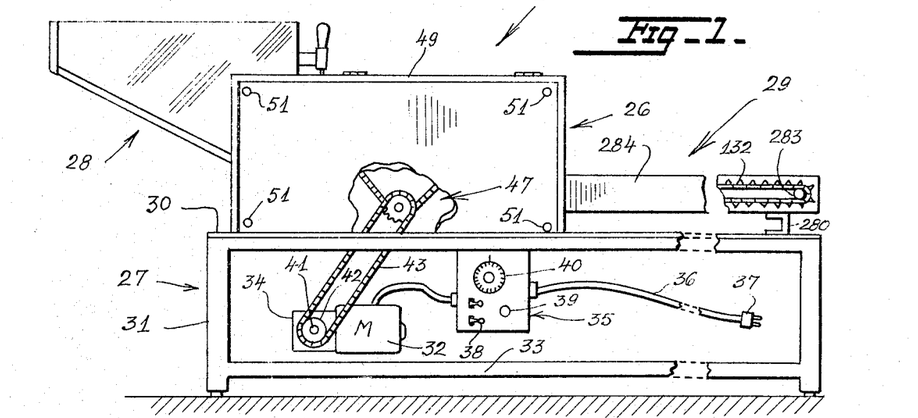
FIG. 1 is a rear elevational view of the pen imprinting machine and showing a portion thereof broken away.

Referring now to the drawings in detail, the numeral 25 represents a pen imprinting machine according to the present invention, and includes a mechanism housing 26 mounted upon a cable or frame 27, a hopper 28 for receiving pens to be imprinted and a conveyor 29 for carrying the imprinted pens during drying operation. The frame 27 includes a flat top panel 30 upon which the mechanism housing 25 is placed. The frame includes the plurality of upstanding legs 31 for supporting the panel 30 at a sufficient elevation so that the machine may be conveniently operated or attended by a workman. An electric motor 32 is mounted upon a cross beam or panel 33 upon the frame and the motor includes a gear reduction mechanism 34. A control box 35 is mounted upon the frame 27 and an electric cord 36 having a plug 37 at the end thereof provides a means for delivering electrical power from a source to the control box. The control box includes an off-on switch 38, a lamp 39 for visually indicating when the power is on and a speed-control dial 40.

An outward shaft 41 upon the gear reduction has a gear 42 secured thereto over which a sprocket chain 43 is passed for delivering power to the mechanism housing unit. The mechanism housing unit 25 includes a pair of longitudinally extending upstanding panels 44 and 45 which form a principal support for the mechanism.

Figure 2:
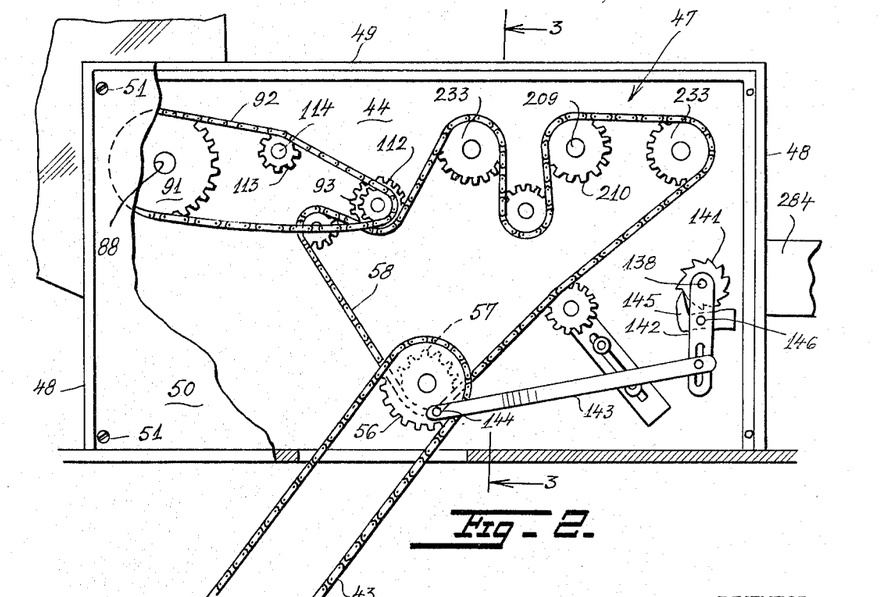
FIG. 2 is a rear elevational view showing the drive mechanism of the machine.

On the rear side of panel 44 a case 46 is provided within which a drive assembly 47 is carried. The case 46 includes a pair of upstanding end walls 48, a top wall 49 and a removable rear panel 50 secured to the case by means of screws 51. The case encloses a central compartment 52 within which the drive assembly is contained. A main shaft 53 is supported in bearings 54 in the panel 44 and in bearings 55 in the panel 43. One end of the main shaft extends into the compartment 52 of the case 46 and a pair of sprockets 56 and 57 are secured thereupon. The sprocket 56 is in engagement with sprocket chain 43 thereby delivering power from the motor to the mechanism housing unit.

An endless chain 58 is passed around the sprocket 57 and is in engagement with a plurality of sprockets that drive the printing mechanism, the chain 58 being also in engagement with a plurality of sprockets that drive the feed mechanism of the machine.

*Feed Mechanism*

Figures 6, 7:
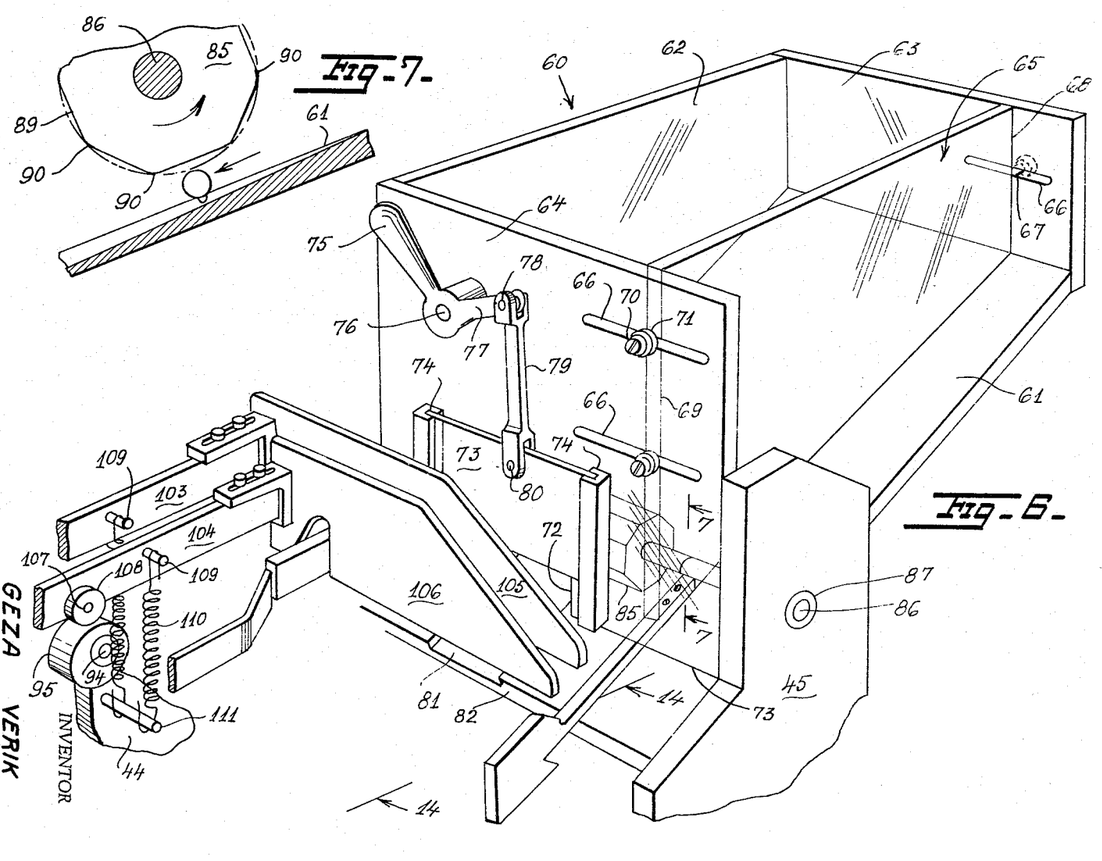
FIG. 6 is a perspective view of the hopper and feed mechanism.
FIG. 7 is an enlarged cross-sectional view taken on the line 7—7 of FIG. 6.
Figure 16:
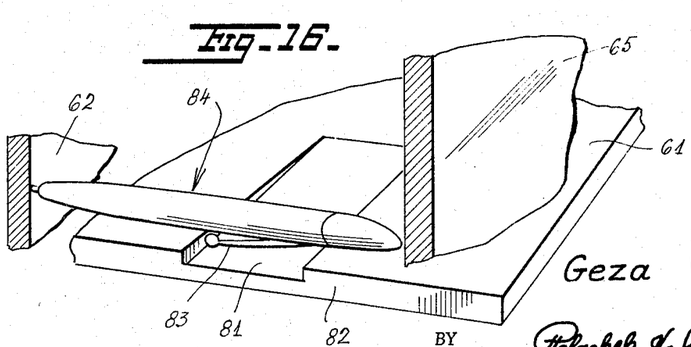
FIG. 16 is a fragmentary perspective view of a portion of the hopper and illustrating the position of a pen when leaving the hopper.

The feed mechanism for delivering the pens to the printing mechanism includes a hopper 60 secured to one longitudinal end of the mechanism housing unit 25. The hopper is made preferably from transparent panels of rigid plastic material so that an operator can readily see therethrough to be informed of the quantity of pens contained therein and thus know when an additional quantity of pens is to be placed into the hopper so as to keep the machine in continuous operating condition. The hopper includes a bottom panel 61 which is in an inclined position as shown in FIGS. 4a and 6. The hopper further includes a stationary upstanding side wall 62 secured between opposite end walls 63 and 64. The hopper further includes a slidable wall 65 which is adjustable to suit the length of pens to be contained within the hopper as is shown in FIG. 16. The end walls 63 and 64 are provided with a plurality of horizontal slots 66 through which projections 67 on the end edges 68 and 69 of the movable wall 65 project a screw 70 having an enlarged head and carrying a washer 71 which bears against the outer side of end panels 63 and 64 is threaded into the projections 67 thereby providing a means for securely locking the movable panel 65 in a desired position. An opening 72 is provided along the lower edge 73 of the panel 64 through which pens may be dispensed out of the hopper. A vertically slidable door 73 is retained between channels 74 on the outer side of panel 64. The door may be manually raised by a pivotable handle 75 rotatable about a stud 76 secured on panel 64. The handle 75 has an arm 77 extending radially outward and being pivotably secured at its end by means of a pin 78 to one end of a link 79. The opposite end of the link is secured pivotally free by means of a pin 80 to the door 73 thereby providing a means for raising the door when the machine is to be placed into operation.

As shown in FIGS. 6 and 16 it is to be noted that the lower end of hopper panel 61 is provided with a recess 81 which opens out upon the edge 82 of panel 61 and is for the purpose of accommodating clips 83 secured conventionally to pens 84. As shown in FIGS. 4a and 6, a dispensing roller 85 is positioned in spaced apart relation over the groove 81. The roller 85 is securely mounted upon a shaft 86 which extends through side panels 62 and 65 of the hopper and is supported in a front bearing 87 upon the panel 45 and in a bearing 88 on the panel 44. The roller 85 is located within the hopper. As can be readily seen in FIG. 7 of the drawing, the dispenser roller is of generally cylindrical configuration but wherein the cylindrical side thereof is broken by a plurality of flat sides 89 between each of which there is a relatively narrow cylindrical arc 90. The cylindrical arc is subscribed about a center which is in the center of shaft 86. In the present form of the invention, the dispensing roller is shown to have eight flat sides. Above dispensing roller 85 there is a plate 64a secured to panel 64, whereby eliminating the possibility of any pens 84 sliding between dispensing roller 85 and panel 64 causing a jam when the hopper 60 is filled with pens. The dispensing roller 85 has a space of accurate dimension provided between the upper side of panel 61 and the face 89 which is sufficient enough to allow a pen to slide therebetween. When the dispensing roller is rotated so that an arcuate portion 90 is closest to the panel 61, the arcuate corner pushes the pens 84 into a single row and thereby allowing them to fall freely forward thereof.

Figure 15:
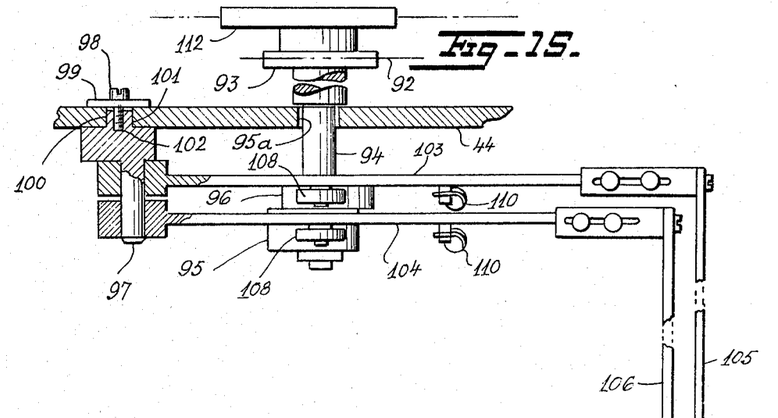
FIG. 15 is a cross-sectional view taken on the line 15—15 of FIG. 14.

The rear end of shaft 86 extends into the compartment 52 of the case 46 where a sprocket 91 is secured thereupon. An endless chain 92 is passed around the sprocket 91 and around a sprocket 93 which transmits power to the chain. The sprocket 93 is mounted upon a stub shaft 94 rotatable within a bearing 95 of the panel 44. At one end of the stub shaft 94 a pair of cams 95 and 96 are secured thereto. The cams are of like peripheral contour. However, they are positioned upon the shaft so that the high positions of the cams are one-hundred-eighty degrees apart. A stud 97 is secured to the panel 44 by means of a screw 98 having a washer 99 as shown in FIG. 15. The stud 97 has a central axis which is offset from an axis of a projection 100 formed on one end of the stud, the projecting being receivable within an opening 101 in the panel 44. The projection has a threaded opening 102 therein which receives the screw 98. The projection is of a lesser length than the thickness of the panel 44 thereby allowing rigid securement of the stud to the panel 44 when the screw 98 is tightened. The purpose of the offset projection relative to the stud is for the purpose of fine adjustment of a pair of pivotable arms 103 and 104 carried on the stud. Each arm is supported at one end upon the stud and at the opposite end of each arm there is an arrestor plate 105 and 106 as is shown in FIGS. 4a, 6, 15 and 16. Between the opposite ends each arm 103 and 104 at an intermediate point has a pen 107 secured therein upon which a ball bearing 108 used as a cam follower is rotatably mounted. Each of the ball bearings are in engagement with one of the cams 95 and 96. Another stud 109 mounted in each arm 103 and 104 receives one end of a tension coil spring 110. The opposite ends of the coil springs are received around a pen 111 rigidly mounted in the panel 44. The springs normally urge the ball bearings to remain in engagement with the cams. It would be readily noted that rotation of the cams will cause the arms, to pivot about the stud 97 thereby causing the arrestor plates to be alternately lifted up and downwardly as indicated in FIG. 4a. It will be further noted that each arrestor plate is located above the lower portion of hopper plate 61 and each plate moves sufficiently upward and downward to stop and alternately release a pen being discharged from the hopper. The sprocket 112 is driven by sprocket chain 58 as shown in FIG. 2, which provides a source for delivering power to the shaft. Another sprocket 113 in engagement with chain 92 provides tension means to the chain. Sprocket 113 is mounted upon an adjustable stub shaft 114 which will provide tension adjustment.

*Printing Mechanism*

The printing mechanism includes a conveyor assembly 125 which receives the pens from the hopper, a transfer assembly 126 which transfers the pens momentarily from the conveyor assembly to a printing head assembly 127, and a pair of ink fountain assemblies 128.

The conveyor assembly 125 comprises a pair of endless sprocket chains 129 in spaced apart relation. Each chain is made up of conventional links 130 secured together by means of pens 131 in a conventional manner. Each alternate pair of links has a triangularly shaped spur 132 secured thereto which serves as a divider between the pens 84 being carried upon the conveyor assembly. An adjustable shaft 133 is supported at each end rotatably free within bearings 134 in the panel 44 and in bearings 135 in the panel 45. A pair of sprockets 136 are mounted upon the shaft 133, each of the sprockets being engaged with one of the sprocket chains 129. The sprocket chains extend in a generally horizontal direction and at their opposite ends pass around sprockets 137 secured rigidly upon a shaft 138. The shaft 138 is supported rotationally free within bearing 139 in panel 45 and within a bearing 140 within panel 44. One end of the shaft 138 extends into the case 46 where a ratchet wheel 141 is secured thereto. One end of an arm 142 is freely pivotable about shaft 138 and the opposite end of the arm is connected pivotably free to one end of a link 143. The opposite end of the link is secured pivotably free to a pen 144 mounted upon the sprocket 56. The pawl 145 is pivotably mounted on a pen 146 on the arm 142, the pawl being normally urged by means of gravity or spring loading into engagement with the ratchet wheel 141. Thus, continuous rotational movement of the sprocket 56 is transmitted to intermittent rotational movement to the shaft 138.

Figure 3:
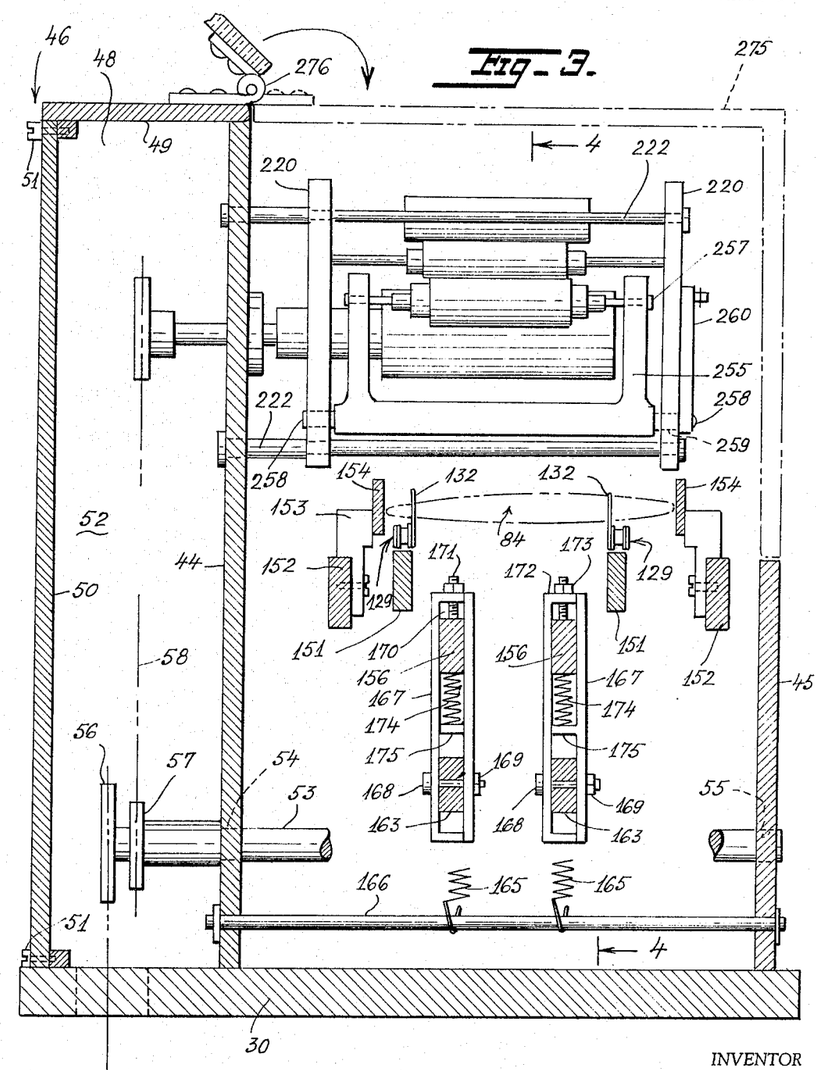
FIG. 3 is a cross-sectional view taken on the line 3—3 of FIG. 2 and looking into the direction of the arrows thereof.

Upstanding panels 44 and 45 are secured together by means of end plates and cross rods 150 to provide support means for rails 151 and the bars 152. The rails 151 support the underside of the conveyor chain during its travel between sprockets 136 and 137. The rails support only that segment of the chain which is laden with the pens. The bars 152 provide support means for blocks 153 to which guides 154 are attached. It is to be noted that the guides 154 are spaced apart a distance equal to the length of the pens moving therebetween upon the conveyor chain 129. Accordingly in view that the machine is adaptable for pens of various lengths, the space between the guides is accordingly adjustable. This is accomplished by the bars 152, 152', being slidably adjustable on the cross rods 150, 150'. A set screw 155, 155' provides locking means between the bar 152, 152' and cross rod 150, 150' after adjustment is accomplished. It would be noted that the pens 84 straddle the two sprockets chains 129 as is indicated in FIG. 3, and the ends of the pen bear against the guides 154, 154'. In such position, the pens, one of which is located between each of the spurs on each sprocket chain, thus are carried from the hopper to a point immediately below the printing head assembly.

Figure 4:
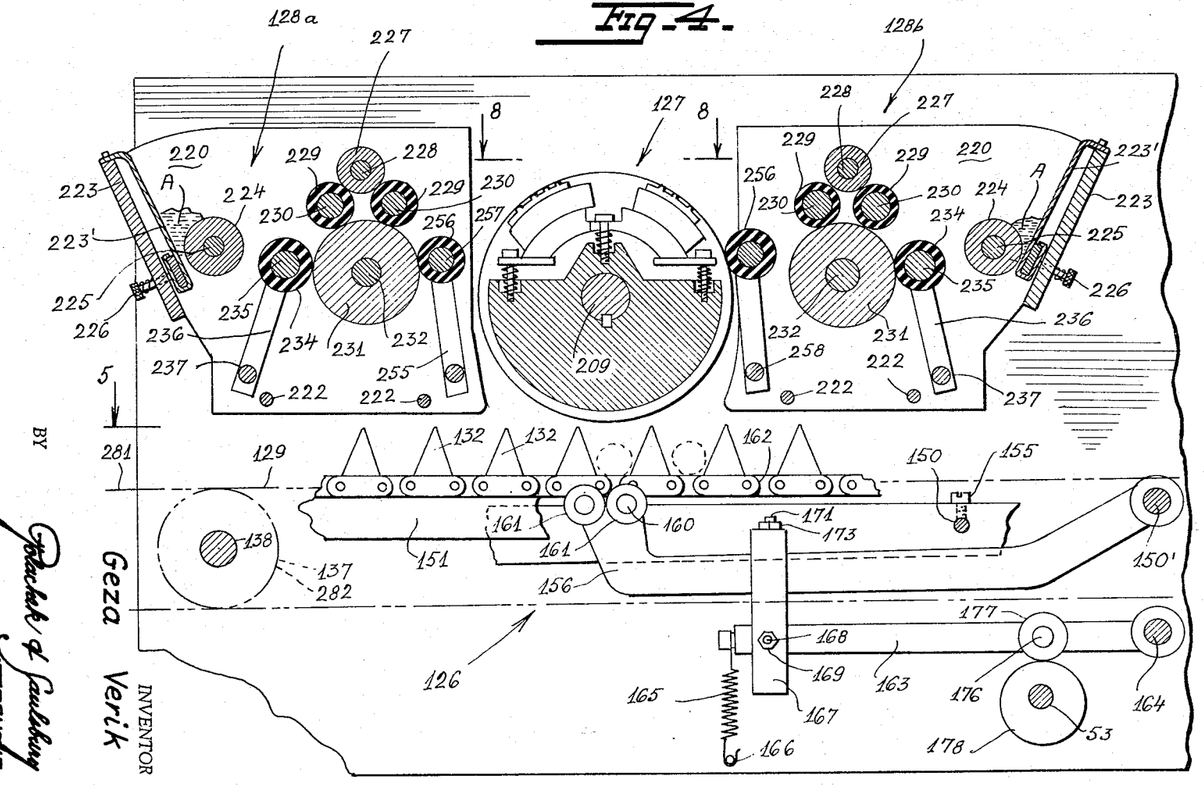
FIG. 4 is a cross-sectional view taken on the line 4—4 of FIG. 3.
Figures 4A, 8, 9, 10:
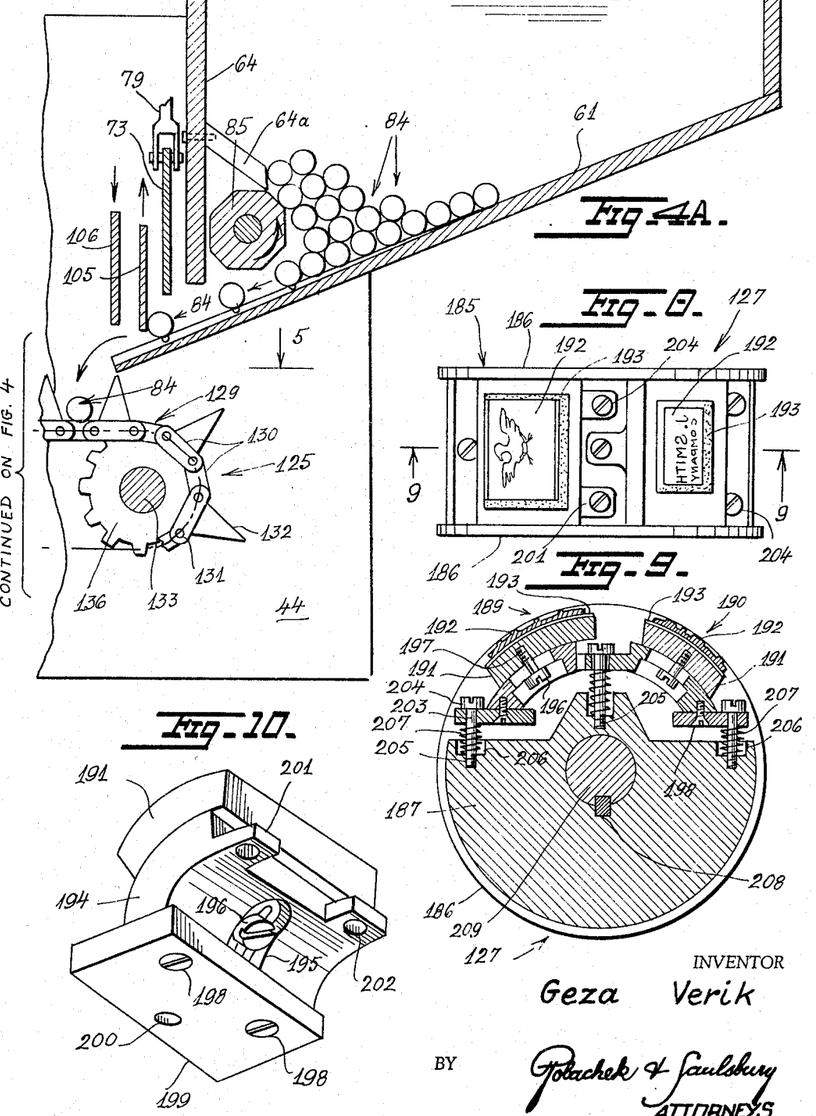
FIG. 4a is a cross-sectional view taken also on line 4—4 of FIG. 3 and showing a continuation of the structure illustrated in FIG. 4.
FIG. 8 is a top view of the printing head as viewed on line 8—8 of FIG. 4.
FIG. 9 is a cross-sectional view taken on line 9—9 of FIG. 8.
FIG. 10 is an enlarged perspective view of one of the printing plate mounting units.
Figure 5:
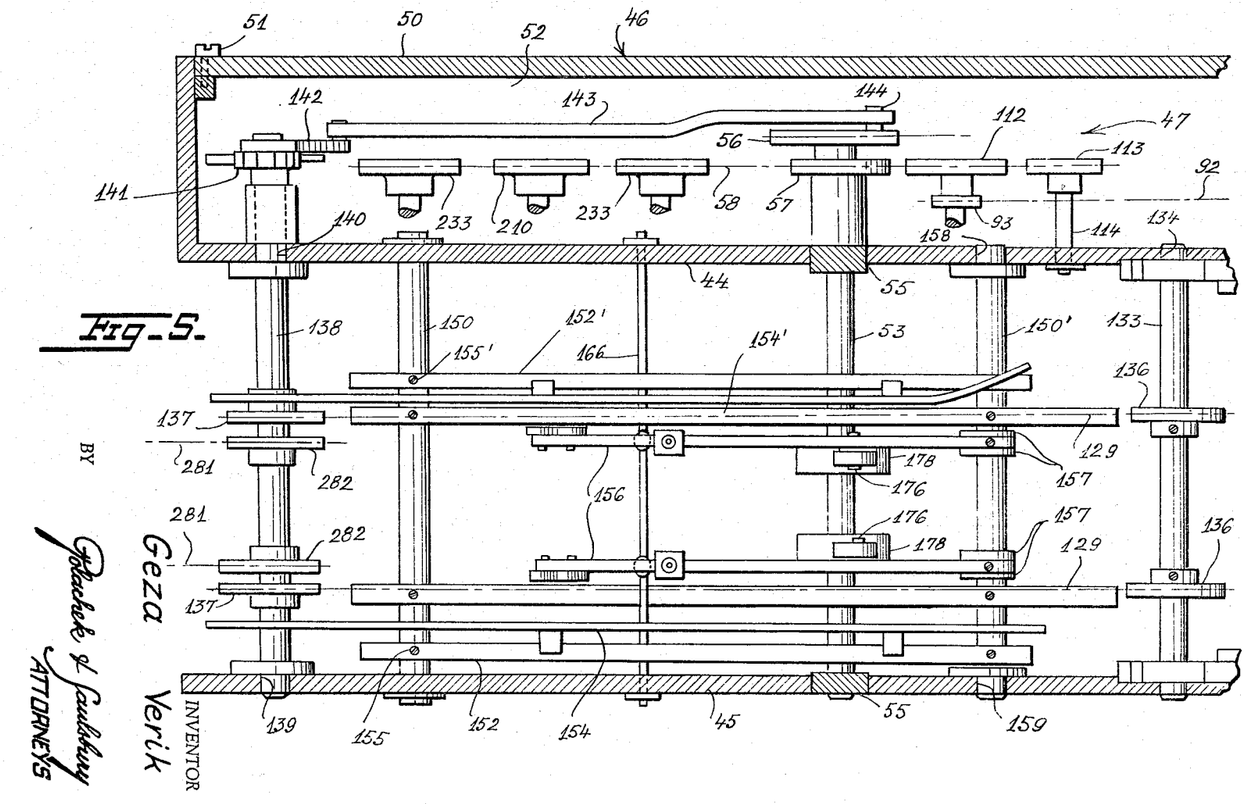
FIG. 5 is a horizontal cross-sectional view taken on the line 5—5 of FIGS. 4 and 4a in combination.

The transfer assembly 126 shown in FIG. 4 comprises a pair of levers 156 pivotable at their one ends about a shaft 150' held between bushing 157 and rotatable within bearings 158 in panel 44 and bearing 159 in panel 45. At the opposite end of each lever there are a pair of pins 160 upon each of which there are a pair of freely rotatable wheels 161. It shall be noted that the wheels are positioned rotatably close to each other so as to form a crotch 162 thereabove for supporting a pen therein. The transfer assembly includes a lower pair of levers 163 which are pivotable about their one ends about a shaft 164 supported at its opposite ends in the panels 44 and 45. At its opposite ends each lower lever 163 is secured to one end of a tension coil spring 165, the opposite end of the tension coil spring being secured about a pen 166 supported at its opposite ends in the panels 44 and 45. One end of the lower lever shows an upstanding yoke 167 secured to the lever by a screw 168 secured by a nut 169. Each yoke has an opening 170 through which one of the upper levers 156 passes. A screw 171 extending downwardly through the top wall 172 of the yoke extends into the opening 170, the lower end of the screw bearing against the upper surface of the upper lever 156. The screw provides a fine adjustment for the mechanism. A nut 173 locks the screw 171 after adjustment. A compression coil spring 174 has a lower end bearing against a web 175 formed on the yoke and the upper end of the compression coil spring bears against the underside of the upper lever normally urging it upwardly against the bottom of the screw 171. The compression coil spring provides a safety feature against breakage of any pens or injure to the machine in case by accident more than one pen may have been lodged into the space assigned upon the conveyor chains for only a singular pen. In such a case, the upper lever will bear down against the spring 174 during normal operation of the transfer assembly. A pin 176 is secured in each lower lever and a ball bearing used as a follower 177 is mounted rotatably free thereupon. Each cam follower is in engagement with a cam 178 secured upon the main shaft 53 which provides drive means to the transfer assembly.

The printing head assembly 127 comprises a cylindrical unit 185 and which includes a pair of circular disks 186 secured to each side of an approximately semi-circular main body 187 as shown in FIGS. 8 and 9 where the disks are of a rotatably larger diameter than the main body. Additionally each printing head assembly includes a pair of printing plates mounting units 189 and 190. Each mounting unit includes an arcuate printing plate 192 made of rubber, metal, plastic or the like is secured by means of adhesive tape 193 or the like. It is understood that such tape has adhesive on both sides. The platen is adjustably mounted to an arcuate base 194, the base having an arcuate slot 195 through which a screw extends, the threaded end of the screw being threaded in an opening 197 in the platen. Thus, rotational adjustment is made possible relative to the platen and the base. The base is attached by means of screws 198 to a block 199 having either one or two openings 191 therethrough. The base likewise has one or two tabs 201 and an opening 202 is provided through each tab. The mounting units are secured to the main body by screws 203 having enlarged heads 204. The screws are secured in threaded openings 205 in the main body and each threaded opening is a toner board as shown at 206 for receiving therein one end of a compression coil spring 207. The opposite end of the compression coil spring bears against the underside of each tab 201 or the underside of the block 199, thereby maintaining the mounting units in spring loading position over the main body. It is to be noted that the arcuate platen and the arcuate base are formed having radiuses from the center of the printing head assembly. Thus it will be readily appreciated that each platen is arcuately slidable and that each mounting unit is adjustable by means of the screws 203 so that the printing surface of each printing plate 192 is on approximately the same radius as the radius of each disk 186. It is to be further noted that each printing plate mounting unit is secured by means of three screws to the main body as shown in FIG. 8 thereby allowing also lateral adjustment if necessary so that proper pressure of the printing plate at all points is accomplished against the pen barrel. The printing head assembly is mounted by means of a key 208 upon a shaft 209. The shaft and the printing head each have an associate keyway for accommodating the key 208. The shaft 209 is mounted rotatably free in a bearing in the panel 44 and the end of the shaft extends into the case 46 where a sprocket 210 is secured thereupon. The sprocket 210 is engaged by endless sprocket chain 58 and is driven thereby.

Each ink fountain assembly includes a pair of end plates 220 in spaced apart relation and secured together by means of cross rods 222 supported upon the panel 44. The present machine includes a left ink fountain assembly 128a and a right ink fountain assembly 128b each of which is located on one side of the printing head assembly. Each ink fountain assembly includes a transverse plate 223, attached thereto is a transverse spring regulator plate 223' having adjustment by means of a plurality of thumb screws 226. As shown in FIG. 4, the roller 224 and ink regulator plate 223' form a crotch on the upper side therebetween within which printing ink of various colors may be placed as shown at A, extending between the end plates 220. A metal roller 224 is mounted upon a shaft 225 supported at its opposite ends in the end plates 220. Each ink fountain assembly further includes a plurality of ink transfer rollers mounted upon shafts supported at their ends in each end plate 220. Each roller is rotatably free. These rollers include a steel or metal roller 27 mounted on a shaft 228 and a pair of rubber covered rollers 229 in surface engagement with metal roller 227, the rollers 229 being mounted upon shafts 230. Each rubber covered roller 229 is in surface engagement with a metal roller 231 mounted upon a shaft 232. Shaft 232 extends through the panel 44 into the drive mechanism case 46 where a sprocket 233 is secured thereto. Each sprocket 233 is driven by sprocket chain 58 thereby providing rotational drive to the roller 231, such rotational movement being transmitted to the rollers 229 and 227. Another rubber covered roller 234 is mounted upon a shaft 235 carried on a bracket 236 which is pivotable about stub shafts 237 supported in bearings 238 in each end plate 220.

Figure 11:
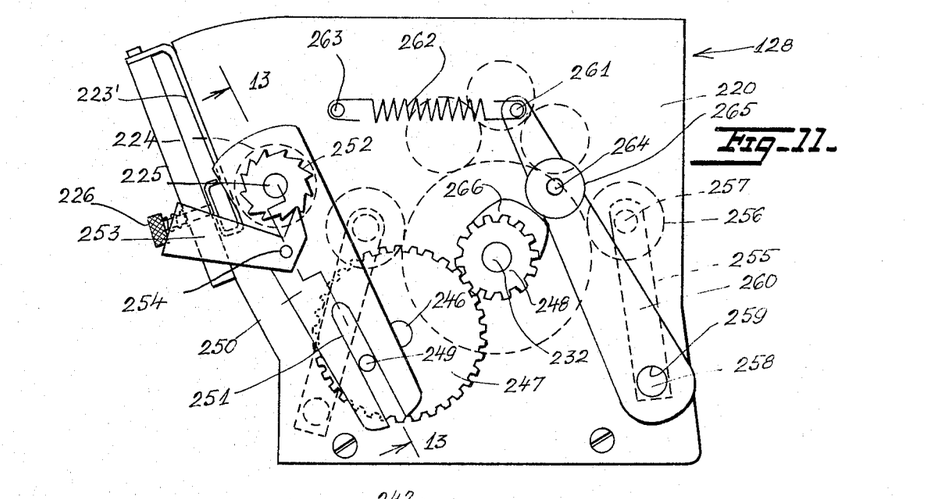
FIG. 11 is a front elevational view of one of the fountains shown in FIG. 4.
Figures 12, 13:
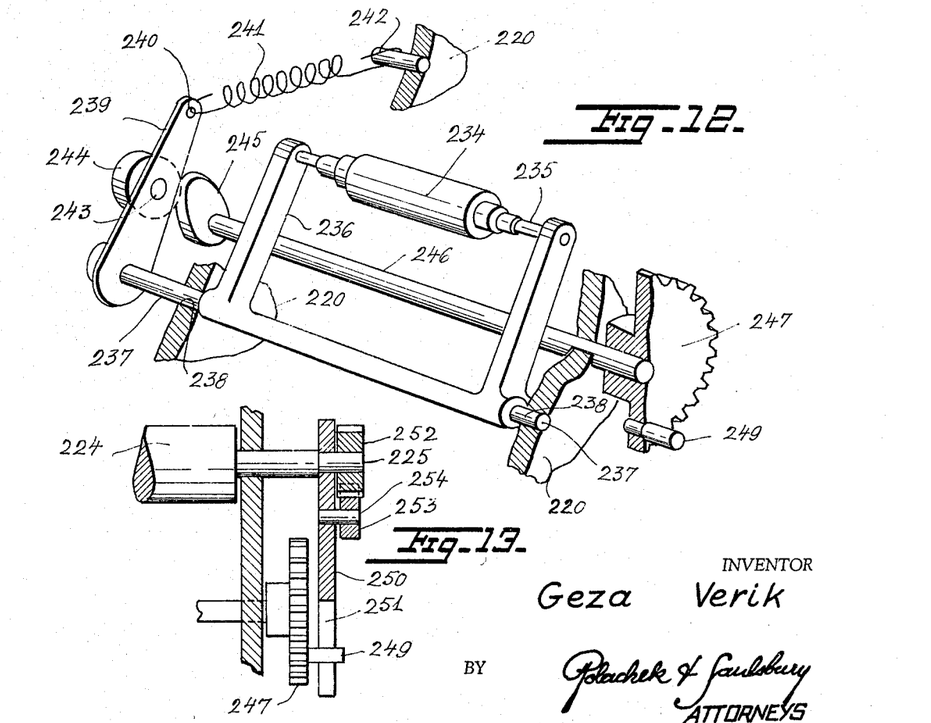
FIG. 12 is a fragmentary perspective view of the drive mechanism of the fountain illustrated in FIG. 11.
FIG. 13 is a cross-sectional view taken on the line 13—13 of FIG. 11.
Figure 14:
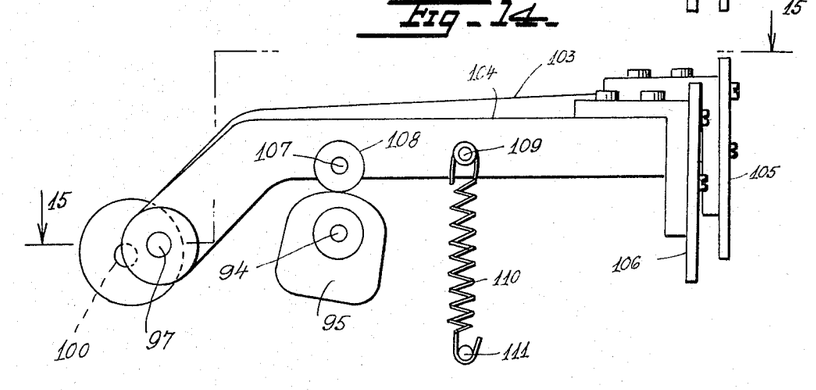
FIG. 14 is a front elevational view of the feed mechanism illustrated fragmentarily in FIG. 6, and as viewed along line 14—14.

At one end of stub shaft 237 a radial arm 239 is secured by its one end. At the opposite end the radial arm has an opening 240 for receiving one end of a tension coil spring 241. The opposite end of the tension coil spring is connected to a pin 242 secured to one of the end plates 220 and at an intermediate point along the length of arm 239, a pin 243 is secured and a rotatable roller 244 is mounted thereupon. Roller 244 is in engagement with a cam 245 mounted securely upon a shaft 246 extending through both end plates 220 and having a gear 247 mounted upon its opposite end as shown in FIGS. 11 and 12. Gear 247 is in toothed engagement with a pinion 248 rigidly mounted upon the end of shaft 232 thereby transmitting rotational movement to the shaft 246 and the cam 245. A pen 249 is mounted upon the gear 247 and is straddled by the bifurcated end of an arm 250. The bifurcated end thus provides a slot 251 within which the pen 249 travels during rotation. The arm is pivoted at its opposite end on the end of shaft 225 adjacent which a ratchet wheel 252 is also securely mounted upon the shaft 225. A pawl 253 is secured by means of a pin 254 upon the arm 250 and is in engagement with the ratchet wheel 252. The pawl provides intermittent movement to the shaft 225 in one direction as the arm oscillates back and forth about shaft 225 due to the movement of the opposite end of the arm caused by the pin 249. Thus intermittently the roller 224 is moved causing some of the ink 226 to be delivered to the opposite side of the roller where intermittently the roller 234 is brought into engagement due to the cam 245 which transmits some of the ink from roller 224 and delivers it to the surface of roller 231. The ink fountain assembly further includes a bracket 255 which carries a rubber covered roller 256 rotatably free on a shaft 257 supported upon the bracket. The bracket is pivotable about stub shafts 258 supported in bearings 259 and the end panels 220. One end of a lever 260 is secured to shaft 258 and the opposite end of the lever carries a pin 261 to which one end of a tension coil spring 262 is secured. The opposite end of the spring is secured to a pin 263 mounted upon the side of one of the end panels 220 and at an intermediate point between the opposite ends of the lever 260, a pin 264 is secured and upon which a roller 265 is mounted freely rotatable. The roller 265 is in surface engagement with a cam 266 mounted upon the shaft 232; thus rotational movement of the shaft 232 causes the roller 256 to transmit ink from the surface of roller 231 to one of the printing plates upon the printing head assembly. It is to be understood that the machine is so timed that the roller 256 will be moved into the path of the appropriate printing plate that is to be inked and that the roller will be immediately moved back toward the roller 231 thereafter so to clear the other printing plate which requires another color and which is accordingly inked by the other ink fountain assembly.

As is shown in FIG. 3 of the drawings a transparent cover 275 may be mounted upon a hinge 276 for a purpose of enclosing the mechanism above described and to keep dust and other foreign matter from falling into the machine yet permitting observation of the printing operation. The hinge 276 is secured to the top panel of the case 46 and may be made to hold the cover 275 in elevated position when the machine is to be serviced as is shown.

The conveyor assembly includes a longitudinal frame one end of which is attached to the printing mechanism housing and the opposite end of which is supported upon a beam 280 resting upon the upper surface of the table panel 30. The conveyor 29 includes a pair of endless sprocket chains 281 in spaced apart relation which pass over sprockets 282 at their one ends and over sprockets 283 at their opposite ends. The sprockets 282 are mounted upon the shaft 138 and accordingly derive their power therefrom. The chains 281 also include similar triangular spur construction as is shown on the sprocket chains 129, thus pens may be readily transferred from one sprocket chain to another. The conveyor assembly further includes guide plates 284 on opposite sides for the purpose of guiding the ends of the pens traveling upon the conveyor assembly. In operative use, a quantity of pens to be imprinted is placed into the hopper, one color of ink is placed into one of the ink fountain assemblies and another color of ink is placed into the other ink fountain assembly. A printing plate is secured to each of the platens and the position of the printing plate is adjusted upon the printing head so that it is upon the correct radial distance in alignment with the periphery of the printing head disks and it is further adjusted so that it is in proper relationship with the other printing plate for the purpose of proper registration during printing. Each printing plate is further adjusted so that it is properly level. The mechaine is put into operation by turning on the control switch and regulating the speed control. The pens are all placed in the hopper with their writing ends toward one side and as the machine starts to operate the roller 85 begins to turn in a direction as is indicated by the arrow in FIG. 4a. Thus, whenever a flat portion comes parallel to the surface 61 of the hopper, a singular pen is allowed to slip through because shortly thereafter a arcuate corner passes and narrows the opening between the plate 61 and the roller 85 thereby preventing another pen to pass, the door 73 being opened and the pen then coming to rest against the arrestor plate 105. Immediately thereafter, the plate 105 is lifted and the plate 106 is lowered and the pen travels until it comes to be rested against plate 106. Meanwhile other pens in subsequent motion are passing under the roller 85 and coming to rest against the arrestor plate 105. The first pen then is allowed to pass when the arrestor plate 106 is lifted allowing the pen to drop upon the conveyor chain 129, the pen falling into a space on each chain between the spurs. Thus, the machine is perfectly timed one pen at a time carried out of the hopper and deposited in one of the spaces between the spurs upon each conveyor chain. The pen is then carried by the intermittent motion of the conveyor chain until it comes directly below the center of the printing head assembly 127. Then, the transfer assembly is activated causing the rollers 161 to raise the pen upwardly and bear it against the peripheral surface of the printing head disks. At same time the printing plates in subsequent stages each come into engagement with the barrel of the pen and print thereupon the two colors, one color being received from each printing plate. During this operation, the pen is rolled around twice, the rolling being accomplished by the printing head disks. Immediately thereafter the transfer assembly is lowered and the pen is again supported upon the conveyor chain. It is then transferred from the conveyor chain 129 to the conveyor chains 281 where again in intermitent steps it is carried toward the opposite end of the conveyor during which time the ink becomes dried. At the end of the conveyor assembly, the pen may be dropped into a bin or the like where it is ready to be packed for shipment.

While the preferred embodiments of the invention have been illustrated and described, it is to be understood that the precise constructions herein disclosed are not limited and that various changes and modifications may be made within the scope of the invention as defined in the appended claims.

What is claimed is:

1. In a pen imprinting machine the combination of a printing mechanism housing enclosing a printing mechanism, a hopper at one end of said housing, a conveyor assembly at the opposite longitudinal end of said housing, a frame below said housing supporting said housing, hopper and conveyor assembly at a level convenient to a workman, a motor carried on said frame for delivering power to said mechanism and a control box mounted on said frame for controlling said motor and said printing mechanism having self-contained means for imprinting a plurality of colors upon said pens being carried from said hopper through said housing and upon said conveyor assembly, said frame comprising a horizontal flat panel, a plurality of upstanding legs, means for supporting said motor below said horizontal panel and said control box supported on said frame below said panel, said control box including an extension cord to a power source, an off-on switch and a speed control dial and said control box being electrically connected to said motor, said hopper comprising an inclined bottom panel, a pair of end panels, a stationary side panel and a multiple opposite side panel, said end panels each having a plurality of horizontal slots, said movable end panel having a plurality of projections, each of said projections extending into one of said horizontal slots, a threaded opening in each of said projections for receiving a screw for rigidly securing said movable panel to said end panels.

2. In a pen imprinting machine the combination of a printing mechanism housing enclosing a printing mechanism, a hopper at one end of said housing, a conveyor assembly at the opposite longitudinal end of said housing, a frame below said housing supporting said housing, hopper and conveyor assembly at a level convenient to a workman, a motor carried on said frame for delivering power to said mechanism and a control box mounted on said frame for controlling said motor and said printing mechanism having self-contained means for imprinting a plurality of colors upon said pens being carried from said hopper through said housing and upon said conveyor assembly, said frame comprising a horizontal flat panel, a plurality of upstanding legs, means for supporting said motor below said horizontal panel and said control box supported on said frame below said panel, said control box including an extension cord to a power source, an off-on switch and a speed control dial and said control box being electrically connected to said motor; said hopper comprising an inclined bottom panel, a pair of end panels, a stationary side panel and a multiple opposite side panel, said end panels each having a plurality of horizontal slots, said movable end panel having a plurality of projections, each of said projections extending into one of said horizontal slots, a threaded opening in each of said projections for receiving a screw for rigidly securing said movable panel to said end panels, said housing containing said printing mechanism comprising a conveyor assembly, a transfer assembly, a singular printing head assembly and a plurality of ink fountain assemblies; said conveyor assembly within said housing comprising a pair of endless sprocket chains in spaced apart relation, each of said chains having a plurality of links connected together by means of pins and each alternate link having an upstanding spur to define a space therebetween for receiving said pens, each of said chains extending in a horizontal direction and passing over a sprocket gear at each horizontal end, said sprocket gears at one end being mounted upon a shaft which is freely rotatable and the other of said sprockets being mounted upon a shaft which is driven, the upper portion of said chain being supported upon a horizontally extending rail, a pair of horizontal guides in spaced apart relation, said guides being at an elevation equal to said spurs for guiding the opposite ends of said pens, both of said guides being adjustably movable for accommodating ends of different lengths, said printing mechanism housing comprising a pair of upstanding spaced apart panels, said conveyor assembly within said housing being positioned between said upstanding panels, one of said panels forming a front panel and the other of said panels forming a rear panel, said rear panel having a case at the rear thereof, said case comprising a pair of parallel upstanding side walls, a top wall and a removable rear panel enclosing a central compartment containing a drive unit for said pen imprinting mechanism, said drive unit comprising a plurality of sprocket chains and a plurality of sprockets driven by said chains, one of said sprockets being mounted upon a main shaft, said one sprocket having an endless chain thereupon, said endless chain being engaged with a sprocket upon the outward shaft of said motor mounted on said frame, another of said sprocket chains within said case driving said conveyor assembly within said housing, said conveyor assembly outside of said housing, said printing head assembly and said transfer assembly and a last of said sprocket chains driving a feed mechanism at the outward end of said hopper, said feed mechanism comprising a transverse roller in spaced apart relation with a diagonally inclined bottom wall of said hopper, said roller having a cylindrical side divided by a plurality of flat sides, said flat sides when turned to a position adjacent and parallel to said lower side of said hopper providing a space for allowing a pen to slide pass therebetween and said cylindrical portions of said roller when turned away from said bottom panel push pens into a single row of said hopper, said feed mechanism further comprising a pair of vertically movable arrestor plates in front of the opening of said hopper and drive means for alternately moving each of said arrestor plates upwardly and downwardly so to intermittently arrest the travel of each of said pens dispensed from hopper prior to allowing said pens to drop upon said conveyor chains, said transfer assembly comprising an upper lever pivotable at one end about a shaft, a second upper lever in spaced apart relation with the first said lever, said second lever also pivoted about said shaft, said levers at their opposite ends having a plurality of pins and a pair of wheels mounted rotatably free upon said pins, said rollers being relatively close to one another to form a crotch thereabove for receiving said pens, said transverse assembly further comprising a pair of lower levers pivotable at their one ends about a second shaft, said lower levers being secured at their opposite ends to a tension coil spring normally urging said roller levers downwardly, each of said lower levers having an intermediate point between their opposite ends, a pin secured thereto, a cam follower rollably mounted on said pins and said cam followers being in engagement with a pair of cams mounted on a drive shaft of said transfer assembly and said drive shaft extending into said case and having one of said sprockets of said drive unit mounted thereupon to provide means for driving said transfer assembly.

3. In a pen imprinting machine the combination as set forth in claim 2 wherein said printing head assembly comprises a cylindrical unit having a pair of circular disks on each side of an approximately semi-circular main body and a plurality of printing plate mounting units, each of said printing plate mounting units being adjustably secured to said main body and each of said printing plate mounting units providing a support for a printing plate secured thereto.

4. In a pen imprinting machine the combination as set forth in claim 3 wherein each of said printing plate mounting units comprises an arcuate platen secured to an arcuate base, each of said bases having an arcuate slot for receiving a screw therethrough, each of said platens having a threaded opening for receiving said screw, said screw having an enlarged head for being drawn against said base for securing said platen relative to said base in an adjusted position, said platen being arcuately adjustable relative to said base, each of said mounting unit bases having lug means openings through said lug means, each of said bases being secured to a block, each of said blocks having an opening means for receiving a mounting screw, said lug means receiving mounting screws, said mounting screws being engaged within threaded openings in said main body, each of said threaded openings having a counterbore for receiving therein one end of a compression coil spring and the opposite end of said compression coil spring bearing against the underside of said lug means or said block of said mounting unit.

5. In a pen imprinting machine the combination as set forth in the claim 4, wherein each of said ink fountain assemblies comprises a pair of spaced apart end plates, a transverse plate between said end plates, a spring regulator plate attached thereto, an ink roller adjacent to said transverse plate, a crotch formed between said ink roller and said transverse spring regulator plate for receiving paste ink, a plurality of ink transfer rollers supported between said end plates of said ink fountain assembly, means for driving one of said ink transfer rollers, the other of said ink transfer rollers being in surface engagement with one another and said driven ink transfer roller, a pivotable bracket between said end plates of said ink fountain assembly, said brackets supporting a roller pivotably movable on said bracket between said ink roller and said transfer rollers for delivering ink from said ink roller to said transfer rollers, said ink fountain assembly further including a second bracket between said end plates, said bracket carrying a roller, said bracket being pivotable to engage said roller with one of said transfer rollers and being pivotable to be engaged with one of said printing plates on said printing head assembly to deliver ink from said transfer rollers to said printing plate.

6. In a pen imprinting machine the combination as set forth in claim 5 wherein said driven roller of said transfer rollers in said ink fountain assembly carries a gear at one end engaged with a second gear, said second gear carrying an eccentric pen engaged in the slot at one end of a lever, the other end of said lever being secured pivotably free on a shaft of said ink roller, said ink roller shaft having a ratchet secured thereto, said lever having a powl mounted freely rotatable thereupon, said pawl being engaged with said ratchet to provide intermittent movement to said ink roller.

7. In a pen imprinting machine the combination as set forth in claim 6 wherein said second gear in said ink fountain assembly is mounted on a transfer shaft having a cam mounted thereupon, said cam being in engagement with a cam follower secured upon an arm mounted on said bracket supporting said roller delivering ink from said ink roller to said transfer rollers.

8. In a pen imprinting machine the combination as set forth in claim 7 wherein said bracket supporting said roller transfering ink from said transfer rollers to said printing head printing plate includes a lever pivoted at one end on said bracket, a cam follower secured to said lever, a cam secured on said shaft carrying said first gear to provide pivotal movement to said bracket for moving said roller between said transfer rollers and said printing head printing plate.

9. In a pen imprinting machine the combination as set forth in claim 8 wherein said conveyor assembly adjacent one end of said housing comprises a pair of endless sprocket chains in spaced apart relation, each of said chains having a spur between each alternate link to define a space for receiving one of said pens and said chains being driven by sprockets mounted upon said shaft driving said conveyor system within said housing.

References Cited by the Examiner
UNITED STATES PATENTS

| | | | |
|---|---|---|---|
| 774,822 | 11/1904 | Biette | 101—40 |
| 879,849 | 2/1908 | Biette | 101—38 |
| 1,314,043 | 8/1919 | Brewer | 101—38 |
| 2,101,775 | 12/1937 | Bullard et al. | 101—40 |
| 2,189,637 | 2/1940 | Litchfield | 101—38 |
| 2,346,174 | 4/1944 | Malnar | 101—40 X |
| 2,442,102 | 5/1948 | Tenety | 101—40 X |
| 2,796,164 | 6/1957 | Hakogi | 101—40 X |
| 3,103,166 | 9/1963 | Sawtelle | 101—37 |

ROBERT E. PULFREY, *Primary Examiner.*

DAVID KLEIN, *Examiner.*

W. F. McCARTHY, *Assistant Examiner.*